INVENTORS
William E. Gruening
BY Herbert C. Brinkman
Word & Word ATTORNEYS

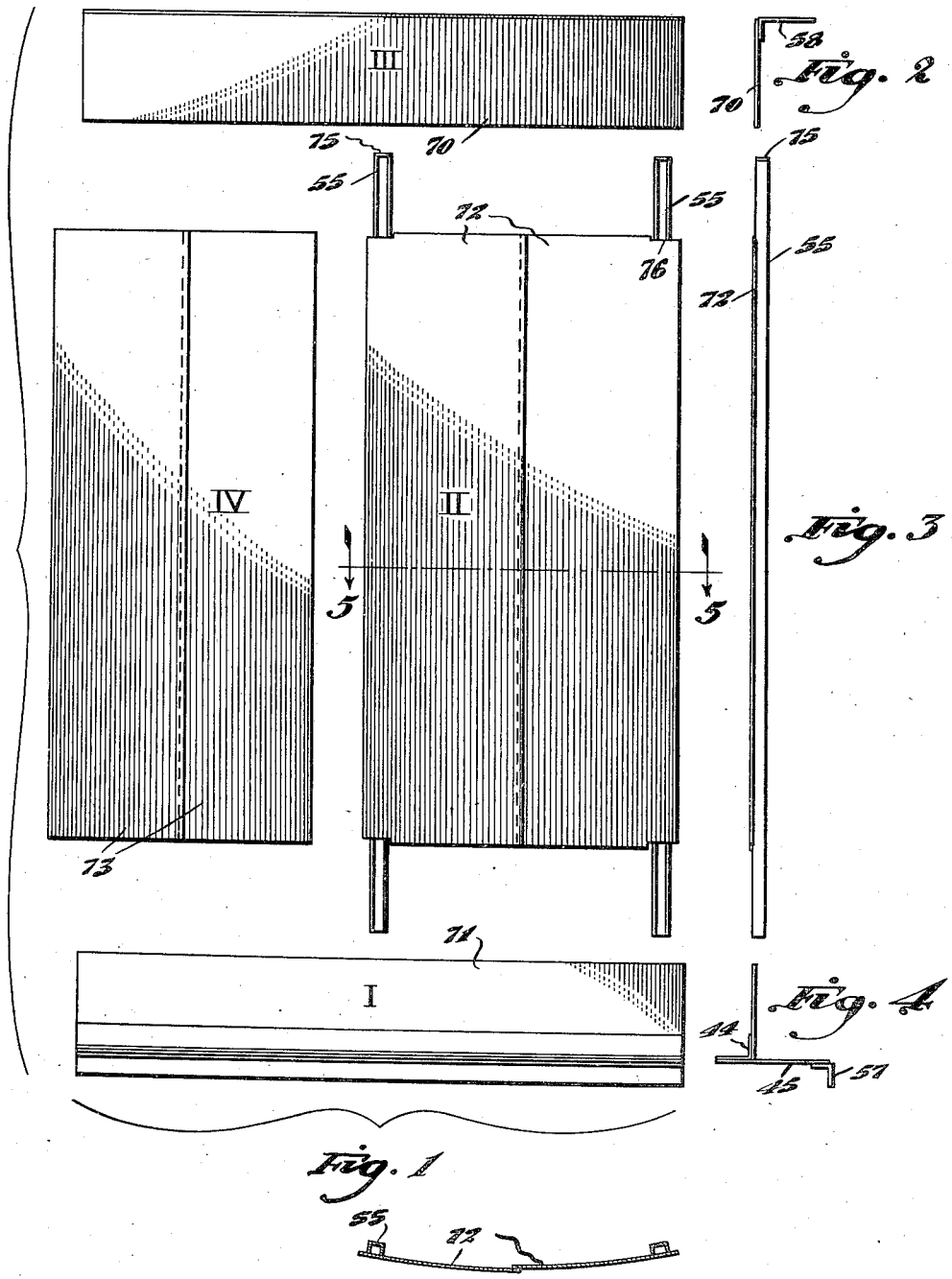

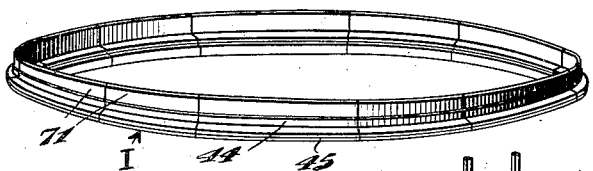
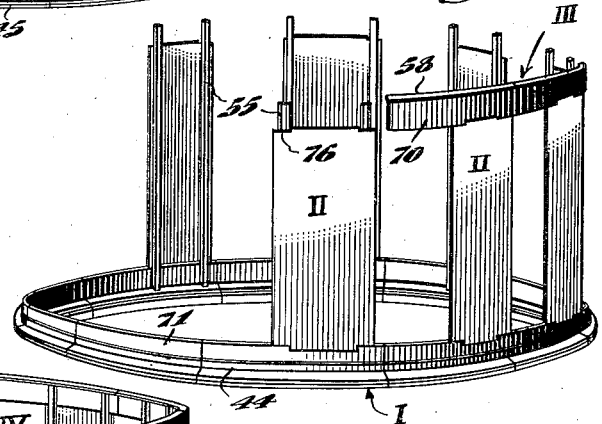
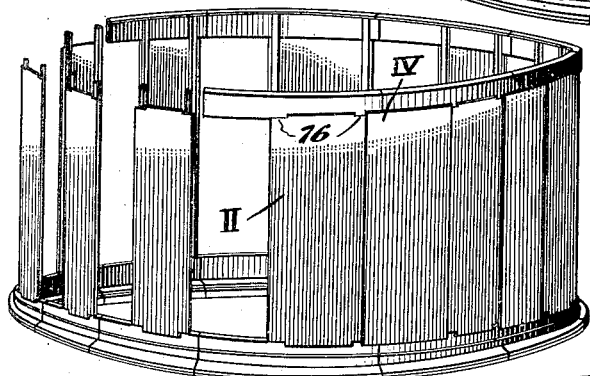
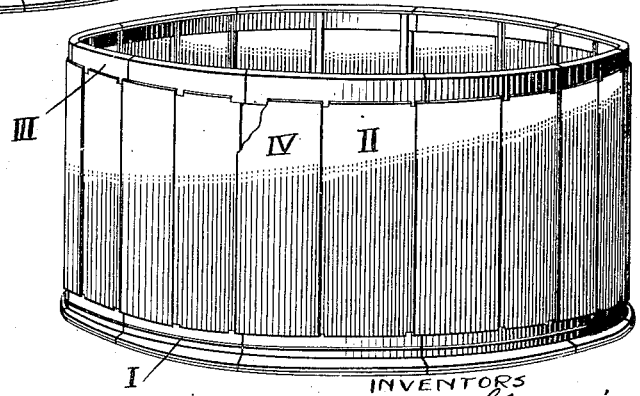

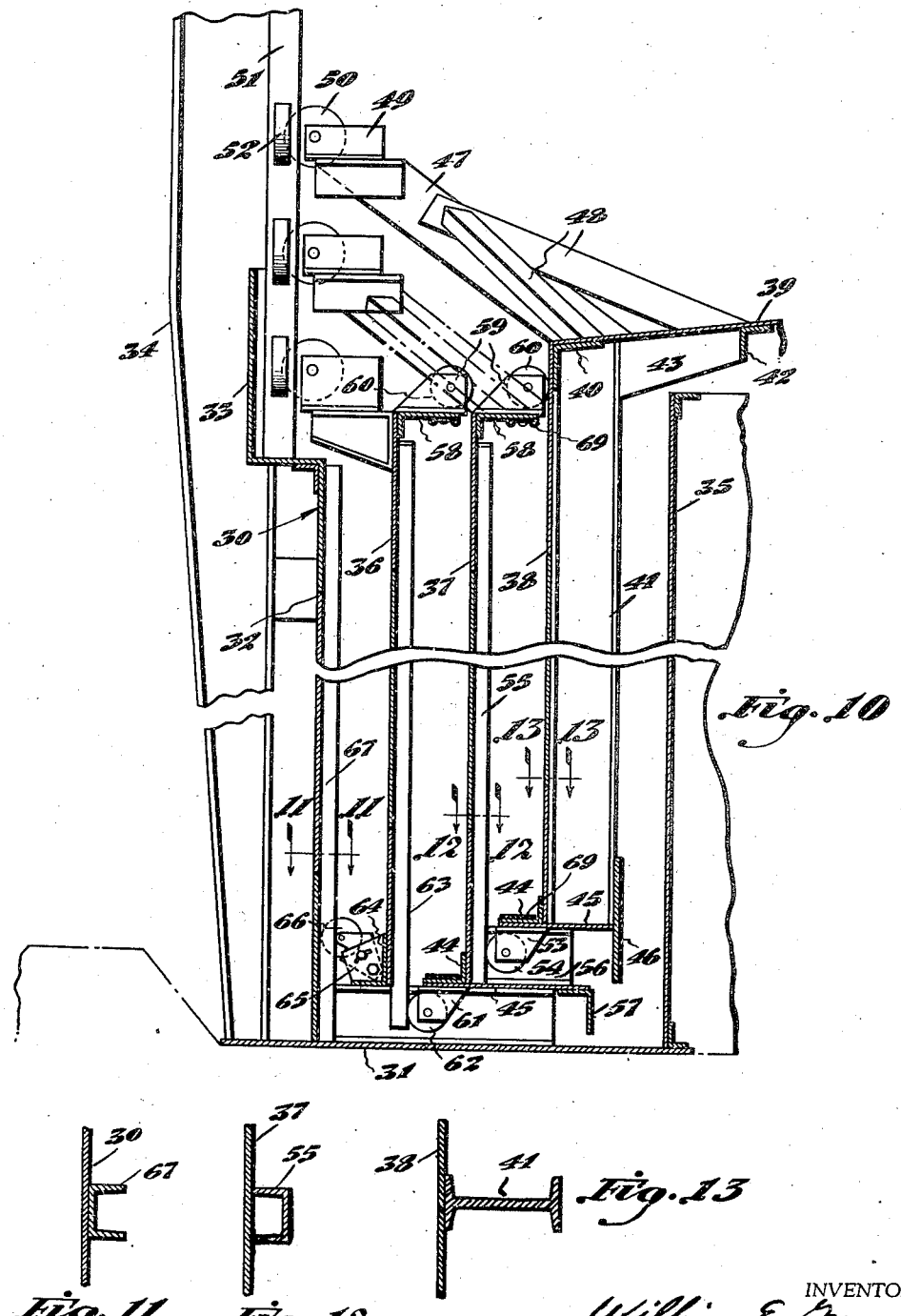

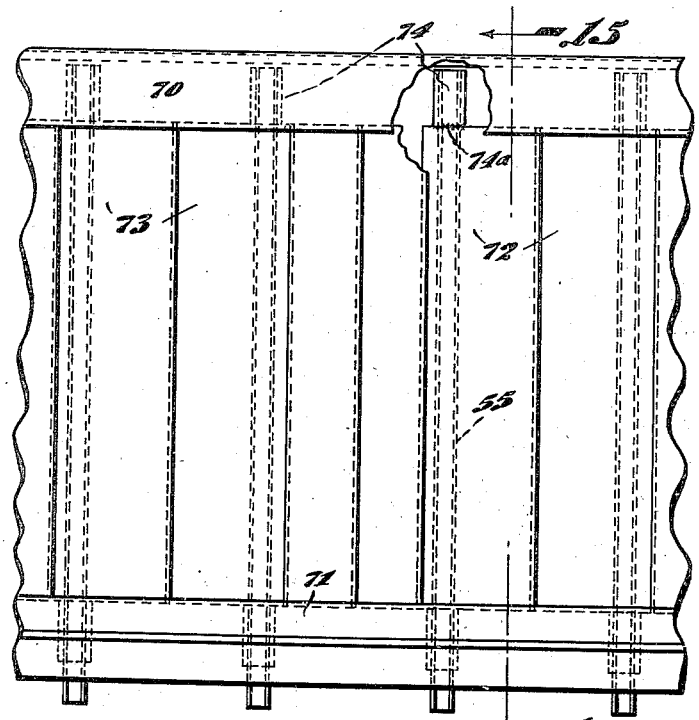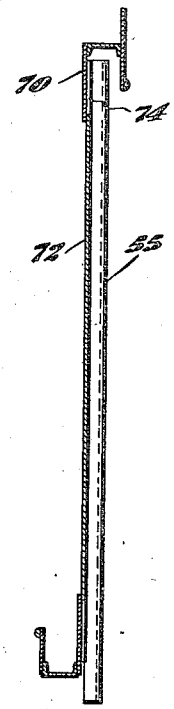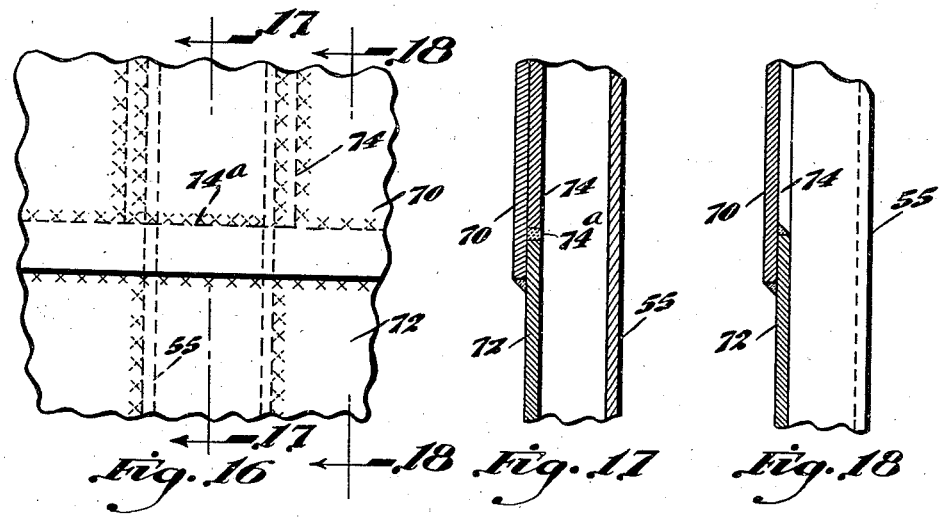

Patented Oct. 10, 1944

2,360,222

UNITED STATES PATENT OFFICE 2,360,222

METHOD OF FABRICATION AND ERECTION OF GAS HOLDERS

William E. Gruening and Herbert C. Brinkman, Cincinnati, Ohio, assignors to The Stacey Brothers Gas Construction Company, Cincinnati, Ohio, a corporation of Ohio Application July 31, 1940, Serial No. 348,938

3 Claims. (Cl. 29—148.2)

This invention relates to a gas holder construction. It is directed to the method of building the holder as well as its structure. More particularly, the invention is concerned with the lift type holder; that is, the type of holder wherein a series of tank sections or lifts nest within a stationary sealing tank, which is filled with water or liquid such as oil. As the holder is filled with gas, the inner section or lift, which includes the roof, raises, and when it has been elevated to its full height, picks up the next section or lift with the result that when the holder is full of gas, all of the sections or lifts have been raised to the total amount of their respective heights. These sections are suitably guided for telescoping movement by means of a guide frame consisting of the necessary columns, girders, and diagonals.

The present inventors have discovered that it is much simpler, less expensive, and more particularly, less hazardous to construct these lifts in nested position; that is, down within the base tank structure, and therefore, close to the ground. In the past, the procedure in the erection of this type of tank or holder, has been to erect the tank bottom and tank walls. The inner lift shell was then built within this tank. When this lift was completed, lowering mechanisms, consisting of drums and sufficient cable, were mounted on the top wall of the tank, and the cables were secured to the bottom section of the intermediate or next lift, which had been assembled on rest blocks, located on the bottom of the tank. The assembled bottom cup section, was then raised up to the approximate top of the tank wall where it was completely riveted. As the plates or panels, which made up the shell of the section, were erected, this assembly was lowered sufficiently so as to permit welding or riveting to be performed from the top of the tank, until finally the entire lift was completed and allowed to come to rest on the bottom of the tank. This procedure is necessary due to the fact that the clearance or distance between the holder sections is so small that it is impractical to work satisfactorily in these areas. Obviously, the work was done at a fairly high elevation and above the protection of the base tank wall, so that in case of a sudden wind or carelessness of the workmen, the wall under construction was apt to collapse.

Accordingly, the broad concept involved here is to assemble and complete the sections or lifts of the tank either progressively outwardly, or progressively inwardly, preferably the latter. In the latter arrangement, the outside lift is constructed first with the assembly taking place from the inside and the lift close to and within the shelter of the outer tank wall. The intermediate lift or lifts and the inside lift are then constructed, the roof being added last.

Through this particular procedure, it has been possible to weld the tank lifts not only on the inside, but on the outside as well. In accordance with the invention and as a supplementary step, the builder can inflate the holder and as each lift section rises above the top of the tank, he can weld on the outside.

Furthermore, it has been determined that a great deal of the welding and assembly operations may be accomplished in the shop of the builder, rather than in the field, and therefore, another phase of the invention resides in the provision of prefabricated sections, readily fitted together at the place of construction. The prefabricated panels can be accurately assembled in jigs in the shop. Warpage can be held to a minimum and allowance can be made for construction, due to welding. This facilitates the field erection and results in a finished holder in which the dimensions more nearly approach the theoretical dimensions. With this improvement in mind, the inventors have disclosed a sectional arrangement wherein the bottom hanging row, including the lift flange, may be assembled from circular segments and likewise, the top hanging row may be assembled in the same way. Large prefabricated panels, including the vertical stiffener members are then assembled around the lift to form the lift wall, and additional filler panel sections added as the work progresses to make up a solid wall.

A further development is provided here, wherein it is possible to weld the externally overlapped panel sections, top and bottom hanging rows, together against the open face of an outwardly facing girder, thus providing a continuous seal, the welding at these points being done entirely from the outside. Other objects and further advantages will be more fully apparent in the description of the drawings.

Figure 1 is an exploded view, showing the various assembly units going to make up a section or lift.

Figure 2 is an end view of a section of the top hanging row and top curb assembly.

Figure 3 is a side edge view of one of the panel sections, making up the wall of a lift.

Figure 4 is an end view of a section of the bottom hanging row and bottom girder.

Figure 5 is a sectional view taken on line 5—5 of the panel section of Figure 1.

Figure 6 is a perspective view, showing the assembly of the bottom hanging row and girder sections.

Figure 7 is a perspective view, showing the construction advanced to include some of the panels and some of the top hanging row and top curb assembly sections.

Figure 8 is a perspective view taken similar to Figure 6, showing the construction of the lift still further advanced.

Figure 9 is a perspective view of the completely assembled lift.

Figure 10 is a sectional view, taken diametrically through one side of the complete gas holder, the view being fragmentary for the purpose of compactness, and showing all of the lifts lowered.

Figure 11 is a sectional view, taken on line 11—11, Figure 10.

Figure 12 is a sectional view, taken on line 12—12, Figure 10.

Figure 13 is a sectional view taken on line 13—13, Figure 10.

Figure 14 is a fragmentary side view, looking at the outside of a portion of one of the lifts, incorporating the conventional cup plate and dip plate.

Figure 15 is a sectional view, taken on line 15—15, Figure 14.

Figure 16 is an enlarged fragmentary view, illustrating the arrangement of the welding at the joint between one of the panels and one of the hanging rows adjacent one of the vertical legs or girders.

Figure 17 is a sectional view, taken on line 17—17, Figure 16, further detailing the welding at the girder.

Figure 18 is a sectional view, taken on line 18—18, Figure 16, further detailing the welding beyond the vertical leg or girder.

Figure 19:
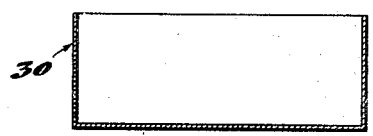
Figure 19 is a diagrammatic sectional view, illustrating the first step in the construction of the holder; namely, the construction of the tank.

Referring to the drawings, it is pointed out primarily that the lifts are assembled; that is, welded together in their lower or nested position within the tank. These lifts may be of several types, there being two types ilustrated— one of these as shown in Figures 1 to 13 inclusive and Figures 19 to 25 inclusive, being the type disclosed in the copending application of William E. Gruening for Gas holder, filed February 26, 1940; Serial No. 320,763, wherein the cup channels and grip plates are eliminated, and packing is incorporated between the lift flanges or curb rails. The other type, shown in Figures 14 to 18 inclusive, includes the cup channels and grip plates. Insofar as certain of the features of this invention are concerned, it is immaterial which of these two constructions is employed.

The first step in the fabrication of the holder is to build the tank 30, shown diagrammatically in Figure 19, and more in detail in Figure 10. Referring to Figure 10, this tank provides a bottom 31, and an outer wall 32, which wall includes an offset portion 33, clearing the rollers of the lifts and extending the tank above a certain elevation and permitting submerging of the lifts to the necessary degree. A series of uprights 34 are arranged circumferentially around the tank and make up the posts of the framework which guide the lifts as they move up and down in the operation of the tank. These uprights may be connected by any suitable circumferential arrangement of girders and bracing members. The tank may be provided with an inner wall 35 formed of light sheet metal in which case that portion of the tank centrally of the annular trough, which contains the lifts, is filled with water to the same level as the oil in the annular tank, and thus, there is very little hydrostatic pressure on the inner tank wall.

Described in general, the outside lift is indicated at 36, the intermediate lift at 37 and the inner lift at 38. The inner lift is in the form of a bell, including the roof 39 for the structure. The roof is connected to the side wall of the bell by means of a circumferentially arranged angle iron member 40. The side wall is braced by means of I-beams 41 (Figure 13), disposed vertically around its inside wall. An angle iron girder 42, is disposed circumferentially around the roof on the inside thereof, and fins 43 extend between the rail and each girder or I-beam 41.

The assembly of elements around the lower end of the lift in each instance may be referred to as a circular, horizontal, stiffening girder, which serves to resist wind loads and transmits these wind loads to the guide frame of the structure, thereby preventing excessive distortion of the walls of the various lifts. Specifically, this girder which may be referred to as a curb rail and is constituted by an angle iron rail 44 strengthened by a horizontal sheet metal plate ring 45 secured against the lower ends of the upright girders 41, and the bottom flange of the angle iron element 44. A heavy vertical band 46, of sheet metal, is attached around the inner side of the lower end of the lift against the lower inner faces of the girders 41.

The upper end of this roof section or bell includes a plurality of radially, upwardly extended carriage frames or bearing extensions 47 appropriately braced by means of braces 48. Upon these extensions are secured carriage heads or bearing brackets 49 each of which has one roller 50 engaging the web of an I-beam guide 51 and rollers 52 engaging the opposite sides of the I-beam guide. Each upright 34 includes one of these guide rails 51.

The curb rail at the base of this section 38 has roller brackets 53 depending therefrom and carrying rollers 54 engaging the webs of the vertical stiffeners 55 of the next section which form guide rails (Figure 12), vertically disposed on the inner wall of the intermediate lift 37. The inwardly projected lower curb rail of the intermediate lift carries a series of support pads 56, upon which the roof lift or inner section rests through its curb rail when in lower position.

The curb rail of the intermediate lift 37 also includes a reinforcing plate 45 and an angle iron rail 44. An angle iron rail 57 stiffens the inner edge of the plate 44. The upper ends of the intermediate and outer lifts 37—36 provide in each instance an inwardly projected curb rail, formed of angle iron strips 58, having long horizontal flanges. These flanges, besides carrying the packing on their undersides, carry bearing brackets 59 on their upper surfaces, journaling rollers 60, engaging against the outer wall of the respectively adjacent sections. A guide arrangement similar to that described for the roof section, extends radially, upwardly from the intermediate and outer sections respectively to the main guide rails of the framework.

Bearing brackets 61 are secured to the underside of the lower curb rail of the intermediate section and carry rollers 62, rolling vertically along the webs of guide rails or girders 63, secured vertically to the inner face of the outer lift section 36. The outer lift section also includes a lower curb rail, formed of an angle iron strip 64. Adjustable bearing brackets 65 carry rollers 66, which roll up and down the vertical guide rails or girders 67, fixed to the inner face of the outer wall of the oil tank 30. The curb rails of the intermediate and lower lift sections are adapted to rest upon supporting pads 68, fixed to the base 31 of the tank.

As set forth in detail in the previously mentioned Gruening application, the upper curb rails of the outer and intermediate lifts and the lower curb rails of the intermediate and inner lifts carry sealing elements 69. These elements 69 cooperate to provide seals between the respective lift sections as each lift rises and carries the next lift with it.

Figure 20:
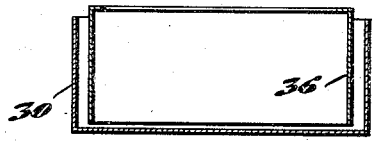
Figure 20 shows the next step in the method of erection; namely, that of constructing the outside lift.
Figure 21:
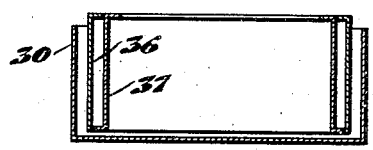
Figure 21 shows the addition of an intermediate lift.
Figure 22:
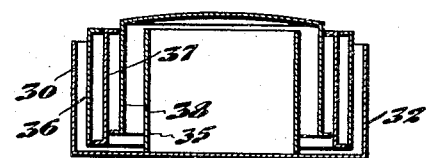
Figure 22 shows the completely assembled holder, including the inside lift and the inside tank wall.
Figure 23:
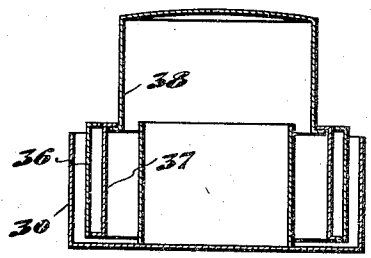
Figure 23 shows the holder inflated, in the method of fabrication, for raising the inside lift to a point where its exterior is accessible for outside welding.
Figure 25:
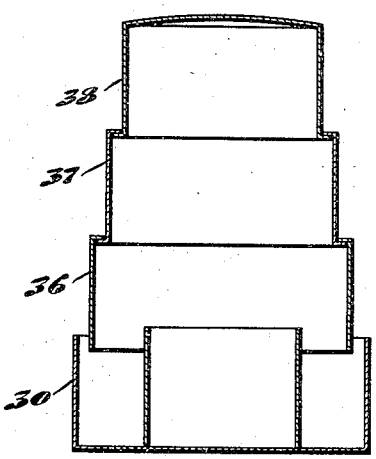
Figure 25 shows the tank fully elevated for access to the lower lift.
Figure 24:
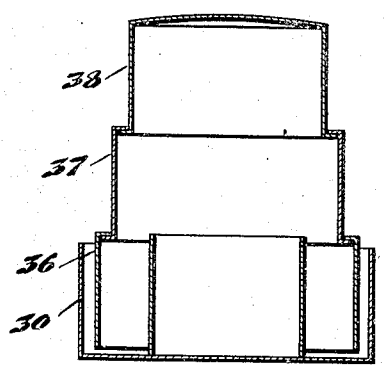
Figure 24 shows the intermediate lift elevated by inflation for accessibility to its exterior surface.

As shown in Figures 20, 21, and 22, the lifts are assembled in nested position and the welding is done on the inside, whereupon the holder is inflated and the lifts are externally welded (see Figures 23 to 25 inclusive). It will be appreciated that the assembly of the lifts may take place in reverse order; that is to say, the tank bottom may be laid, the interior wall 35 set up, and the inside intermediate and outside lifts assembled and welded in the order named, whereupon the outside tank wall may be built. It will be obvious in this case that the welding will be first accomplished on the outside wall, and if desired thereafter, may be performed on the inside walls, although this is not as convenient as the method wherein the welding is last performed on the outsides of the lifts.

In Figures 1 to 5 of the drawings, the prefabricated sections are illustrated. In the present method, much of the welding is done in the plant of the company building the holder, thus cutting down greatly on the amount of welding which must be done in the field. Obviously, conditions within the plant are better suited for more efficient welding and for proper handling of the parts through fixed jigs and clamping means.

As shown, a strip of steel plate, indicated at 70, is welded to the short vertical flange of the angle iron curb rail strip 58. This constitutes one section, indicated at III, of the assembly referred to as the top hanging row and the top curb. Another section constituted by a strip of sheet metal 71, strengthening plate ring 45, angle iron rail 57 (or the vertical band of sheet metal 28), and the angle iron rail 44 goes into the assembly I, referred to as the bottom hanging row and girder.

Another assembly II consists of adjacent panels, constituting a section of the wall of the lift. These panels indicated at 72, are welded together along their adjoining margins 73 and carry vertical stiffeners, say the stiffeners 67, 63, 55, or 41, disposed along their vertical internal margins and welded thereto. These stiffeners project above and below the panels and the assemblies, indicated in Figures 2 and 4, may therefore be welded to the stiffeners with the overlapping horizontal edges of the plates 70, 71, and the horizontal top and bottom edges of the panel plates 72, respectively welded together (Figures 14 to 18 inclusive). Also alternate panel sections, assemblies IV, made of sheets 73—73 and not including the stiffeners or guides are provided and adapted to be attached in the same manner as the other panels to the plates 70 and 71. These Figures 14 to 18, as previously noted, disclose the cup and grip plate construction which is quite conventional in lift type holders. It is therefore believed unnecessary to describe the structure of the top and bottom sections of the lifts shown in these views.

In the prefabrication of the panel units, which include the girders, vertical stiffeners, filler or sealing plates 74 are sealed in position on the girders at the upper and lower ends thereof. This construction is shown in Figures 14 to 18 inclusive. These plates are disposed in the same plane as the panels and have their inner edges butt-welded as at 74a, to the upper and lower edges of the panels. The sheets of metal 70 and 71 are placed in position, overlapping the plates 72—72 of the panels. This overlapping joint is sealed along the inside up to the girders when the lifts are originally assembled. Later, the joints are welded along the outside as the lifts are elevated by inflating the holder. Thus, the inserts or filler plates make it possible to get a seal across the face of the vertical stiffener, which in the case of hollow stiffeners, prevents leakage of air through the girder at this point.

Another way of accomplishing this result is to notch the panel plates as at 76 (Figure 1) to a depth equal to the overlap of the plates. This later construction is shown in Figures 1 to 13 and is preferred over the filler plate described above.

Thus, when the strips of metal 70 and 71 are placed in position, overlapping the plates 72—72 (Figure 18), the lower edge, say of the plate 70 registers with the upper edge of the plate 72 at the notches 76 and by drawing down the plate 70 at the notches, a butt joint may be formed, accessible from the exterior. It would be impossible to weld this butt joint under the pressure exerted by the air when the holder is inflated. Accordingly, a seal plate 75 is placed on the upper end of the channel. The lower end of the channel still being down in the liquid of the tank, the liquid acts as a seal at the lower end of the channel. This arrangement prevents the escape of air into the channel to the butt joints. The sides of the vertical legs have been continuously welded in the shop to prevent any leakage of air from within. This butt will be welded when the lift is in position with the bottom of the vertical channels sealed in the water in the tank. With the plates drawn down into the notches 76, smooth flush vertical guide surfaces for the rollers 60—60 are provided along the lifts adjacent the stiffeners.

As illustrated in Figures 6 to 9, the bottom hanging row and lower curb rail assembly is first completed and rests on the appropriate blocks, shown in Figure 10. The panel assemblies II, including the uprights, are then placed in position and the top hanging row, assembled in sections as the panels are placed in positions (Figure 7). The alternate panel assemblies IV are welded in place as shown in Figure 8. The completed lift is shown in Figure 9. The various panels and parts to be assembled may be apertured to provide for initial assembly by means of bolts, or the assembling or holding of the parts together for welding may be accomplished by the use of wedges or clamps.

When the lifts have been welded together at their interiors, air is blown into the holder and the lifts are raised one by one and the exterior welding of the holder walls accomplished by workmen standing on the horizontal flanges of the lifts (Figures 23 to 25 inclusive).

Having described my invention, I claim:

1. A method of constructing a gas holder of the lift type, comprising, the following steps; assembling the bottom of the stationary tank; constructing the outer wall of the tank, constructing the lifts progressively while the lift sections are fully nested, welding the lifts internally; and thereafter progressively raising the completed lifts and welding the outside walls thereof as each lift is elevated above the level of the next adjacent lift.

2. A method of constructing a gas holder of the lift type, comprising the following steps; constructing the respective lifts while in fully nested position; welding each lift on the side away from the previously constructed lift; constructing the tank surounding the lifts; filling the tank with liquid and inflating the holder so as to cause the lifts to rise in the normal manner; and thereafter welding the lifts on the side opposite to the sides previously welded.

3. A method of constructing a lift of a gas holder of the lift type, comprising, the following steps; assembling segments of the bottom hanging row to make up the completely circular bottom portion; mounting alternate wall panels on said circular bottom portion, said panels having stiffeners providing extensions disposed downwardly and upwardly and making up the full wall height with the exception of the bottom hanging row and the top hanging row; assembling segments of the top hanging row; attaching the segments of the bottom hanging row and top hanging row to the extended stiffener portions; and filling in the spaces between the alternate panels with panel sections to make up the complete lift.

WILLIAM E. GRUENING.
HERBERT C. BRINKMAN.